United States Patent [19]

Gebhardt

[11] 3,746,796

[45] July 17, 1973

[54] TELECOMMUNICATION EXCHANGE SWITCHING NETWORK FOR FOUR WIRE SWITCHING

[75] Inventor: Hartmut Gebhardt, Krailing, Germany

[73] Assignee: Siemens Aktiengesellschaft, Berlin and Munich, Germany

[22] Filed: Aug. 12, 1971

[21] Appl. No.: 171,138

[30] Foreign Application Priority Data

Aug. 18, 1970 Germany .................. P 20 41 052.0

[52] U.S. Cl. .......................................... 179/18 AF
[51] Int. Cl. .......................................... H04q 3/42
[58] Field of Search .............................. 179/18 AF

[56] References Cited

UNITED STATES PATENTS 3,300,587 1/1967 Knight et al. .................. 179/18 AF

FOREIGN PATENTS OR APPLICATIONS 1,066,974 4/1967 Great Britain .................. 179/18 AF
1,058,893 2/1967 Great Britain .................. 179/18 EA

*Primary Examiner*—Thomas W. Brown
*Attorney*—Harold J. Birch et al.

[57] ABSTRACT

A telecommunication exchange installation is described which has a switching network constructed of coupling multiples arranged in several coupling stages. The coupling stages are interconnected over intermediate lines. All local and long distance lines and all inputs and outputs of switching members necessary for the completion of a connection and for connection monitoring are connected in the same manner to the inputs of a first coupling stage. The outputs of the coupling multiples of the first coupling stage are connected to the inputs of the next coupling stage in a pairwise manner. The switching network is constructed for two wire switching, but in a manner which will permit four wire elements to be connected thereover.

2 Claims, 2 Drawing Figures

TELECOMMUNICATION EXCHANGE SWITCHING NETWORK FOR FOUR WIRE SWITCHING

BACKGROUND OF THE INVENTION

The invention relates to circuitry for telecommunication exchange installations, in particular telephone exchange installations having a switching network constructed of coupling multiples in several coupling stages. The stages are interconnected over intermediate lines, and at the inputs of the first coupling stage all lines, eg., local and long distance connection lines, and all inputs and outputs of switching elements necessary for establishment and surveillance of connections, e.g., dial receivers, connection sets, and such, are connected in the same manner. The outputs of the coupling multiples of the first through the last coupling stage are switched to the inputs of the coupling multiples of the respective succeeding coupling stage, and can be switched together pairwise therein. In particular, the very widely known relay coupling multiples are used, as well as crossbar selectors and cross couplers.

A switching network of this type and particularly one with reverse grouping or trunking is described in British Pat. No. 1,058,893. Reverse grouping switching networks offer the advantage that all lines, e.g., local and long distance lines, and switching mechanisms, e.g., dial receiving and forwarding registers, connecting sets and the like, can be arbitrarily connected together, as needed. This offers a great freedom with respect to the establishment of any desired connections without having to switch lines and switching mechanisms onto the switching network twice. Such duplicative switching would be necessary with switching networks having traditional grouping, e.g., the so-called extended grouping, and thus, with switching network inputs to a first coupling stage and switching network outputs from a last coupling stage.

Using the reverse grouping arrangement even incoming and outgoing long distance connections and transit connections can be through-switched over a common switching network. All such through-switching processes can be operated similarly. In particular, two-way or duplex lines (i.e., lines which permit variable establishment of connections in the one or the other direction) also need to be connected to the switching network only once. Further, through the possibility that two inputs of the first exchange switching stage are through-connected only to one exchange switching stage preceeding the last exchange switching stage and can already be connected together therein, a switching network can be proportioned such that in the last coupling stages, over which then not all through-connected connections run, connection switching elements can be saved in comparison with switching networks with traditional extended grouping.

The use of reverse grouping in switching networks for four-wire switching, however, presents a new problem. It is known that four-wire connection paths in telephony and telegraphy have two two-wire branches, of which one serves to transmit messages in one direction and the other serves to transmit messages in the opposite direction. It is customary in the use of four-wire lines and of connection switching elements suited for four-wire switching to refer to the direction of the establishment of a connection: a first wire pair is provided for the transmission of messages in the direction of the establishment of a connection and a second wire pair is provided for the establishment of a connection in the opposite direction. That means that with incoming lines in the direction of the establishment of a connection, the first wire pair serves for message transmission in the incoming direction and the second wire pair serves for message transmission in the opposite direction, i.e., in the outgoing direction. With outgoing lines in the direction of establishment of a connection the first wire pair serves for message transmission in the outgoing direction, and the second wire pair serves for message transmission in the opposite direction, i.e., in the incoming direction. A corresponding relationship will exist for the inputs and the outputs of the previously mentioned switching components, e.g., registers, connection sets, etc., in that an output corresponds to an incoming line and an input corresponds to an outgoing line of a switching mechanism.

If the four-wire lines are connected in a switching network with reverse grouping, it can be achieved in the establishment of a connection over the switching network that the two-wire branch for the incoming transmission direction of the incoming (with respect to direction of establishment of a connection) four-wire line is connected to the two-wire branch for the outgoing transmission direction of the outgoing (with respect to the establishment of a connection) four-wire line. The two-wire branch with outgoing transmission direction of the incoming (with respect to the establishment of a connection ) four-wire line is connected to the two-wire branch with incoming transmission direction of the outgoing (with respect to the establishment of a connection) four-wire line. Through use of the indicated rule in the wiring of a switching network with simply arranged four-wire lines it is, therefore, guaranteed that the correct two-wire branches of two lines always meet.

If two-way four-wire lines are connected to a switching network with reverse grouping, then the problem arises that the respective process for establishment of a connection determines whether the four-wire line is operated incoming or outgoing in the respective case. In order to do justice to the above rule for connecting under these conditions, as well, it is customary to equip line respeaters for two-way four-wire lines with relays, which will facilitate, if needed, a telephone pair crossing. These relays in the repeaters represent, including their control circuits, which are operated from a central control, a considerable expense.

From British Pat. No. 843,175, and the German Pat. Nos. 1,097,491 British Pat. No. 1,058,893 and U.S. Pat. No. 3,428,753 circuits for telephone exchange installations with central control mechanisms are known, and these central control mechanisms are connected from exchange installation to exchange installation with each other over central channels adjoining the trunk lines serving for the transmission of dial signals (setting and line signals, etc.). The exchange of information over a data channel directly between the central control mechanisms of two exchange installations connected with each other over telephone connection lines simplifies and accelerates considerably the construction of a connection, as is known. Namely, if dial signals are transmitted from one central control to the next one, they are passed from central control to central control (with the application of conventional technology) over a forwarding register, outgoing repeater, connection line, incoming repeater, and reception register. In this process, a multiple conversion takes place. This requires a great expense in terms of time, as well as slower establishment of a connection and a great circuitry expense (expensive registers and repeaters). It also raises the danger of a signal falsification (converter error).

The circuits known from the cited patent references start, in contrast thereto, from the principle of effecting the transmission of dial signals on a direct path, thus, circumventing the connection line and its repeaters. An optimal solution in reference thereto consists in the stated measure of connecting central control mechanisms with each other over central data channels which lead from exchange installation to exchange installation, adjoin the corresponding trunk lines, and serve to transmit dial signals. The arrangement of central data channels in this manner enables the direct transmission of dial signals without such repeaters.

Therefore, it is an object of this invention to reduce the total cost necessary for the wire pair crossing with connection of two-way lines and switching mechanisms with four-wire message circuits in a switching network with reverse grouping.

It is another object to provide a circuit through which, with respect to the connection of four-wire lines to a switching network with reverse grouping the switching circuit construction is unified.

A further object of this invention is to provide a switching circuit of this type which uses to advantage data processing technology.

The aforementioned and other objects of the invention are achieved in that a switching network arranged for two-wire switching is provided, and the switching network inputs are subdivided into first and second switching network inputs. Of these, a first and a second switching network input an input pair, which is wired with a four-wire mechanism, which may be the named lines and switching elements. With this wiring, incoming, outgoing, and two-way four-wire mechanisms are connected in like manner to the input pairs, in that the two-wire branch of the four-wire mechanism provided for the incoming transmission direction, viewed from the switching network, is attached to a first switching network input, and the two-wire branch provided for the outgoing transmission direction is attached to a second switching network input of an input pair. For the connection of two four-wire mechanisms over the switching network a two-wire connection between the first switching network input of the input pair attached to the one four-wire mechanism and the second switching network input of the input pair attached to the other four-wire mechanism, and a second two-wire connection between the second switching network input of the input pair attached to the one four-wire mechanism and the first switching network input of the input pair attached to the other four-wire mechanism are through-connected.

Thus, using the invention the named cross-switching relays in the four-wire connected to the switching network are fully eliminated, in that the telephone pair crossing necessary for each connection is undertaken through appropriate operation of the switching network. The four-wire lines are connected uniformly to the switching network. This uniformity extends not only to the uniformity of connection of the lines and switching elements to the switching network, i.e., that all lines and switching elements are connected to equivalent points (inputs) of the switching network, but extends also, in accordance with the invention, to the arrangement of the two two-wire message channels (wire pairs). The wire pairs of all four-wire lines serving an incoming message transmission are connected to first switching network inputs and the wire pairs of all four-wire lines serving an outgoing message transmission are connected to second switching network inputs. This refers to all types of lines and switching elements, i.e., with respect to the direction of the establishment of a connection, incoming, outgoing and two-way lines and switching elements. (Note that the message transmission directions of the two message channels belonging to a four-wire line must not be confused with the direction of the establishment of a connection. The first case concerns a message transmission matter and the last case concerns an exchange switching matter.)

In the connecting of two four-wire lines over the switching network, both wire pairs with incoming message transmission direction are not connected to both wire pairs with outgoing message transmission direction. Every connection consists of two two-wire connections, which are undertaken in such a manner that of two interconnected four-wire lines, the incoming message channel of the one four-wire line is connected with the outgoing message channel of the other four-wire line and the outgoing message channel of the one four-wire line is connected with the incoming message channel of the other four-wire line. The line finding and switching processes which must be completed herefor are standardized with respect to all cases of connection completion. Thus, for given connection one need not be concerned whether and in which combination incoming, outgoing, and two-way four-wire lines and four-wire inputs and outputs of switching elements are to be connected to corresponding switching elements. The wire pair crossing necessary for every connection is undertaken rather through an appropriate connection in the switching network. The described standardization of the switching processes reduces the functional restrictions on the central control mechanism.

BRIEF DESCRIPTION OF THE DRAWINGS

The invention will be best understood by reference to a description of a preferred embodiment thereof given hereinbelow in conjunction with the drawings in which.

Figure 1:
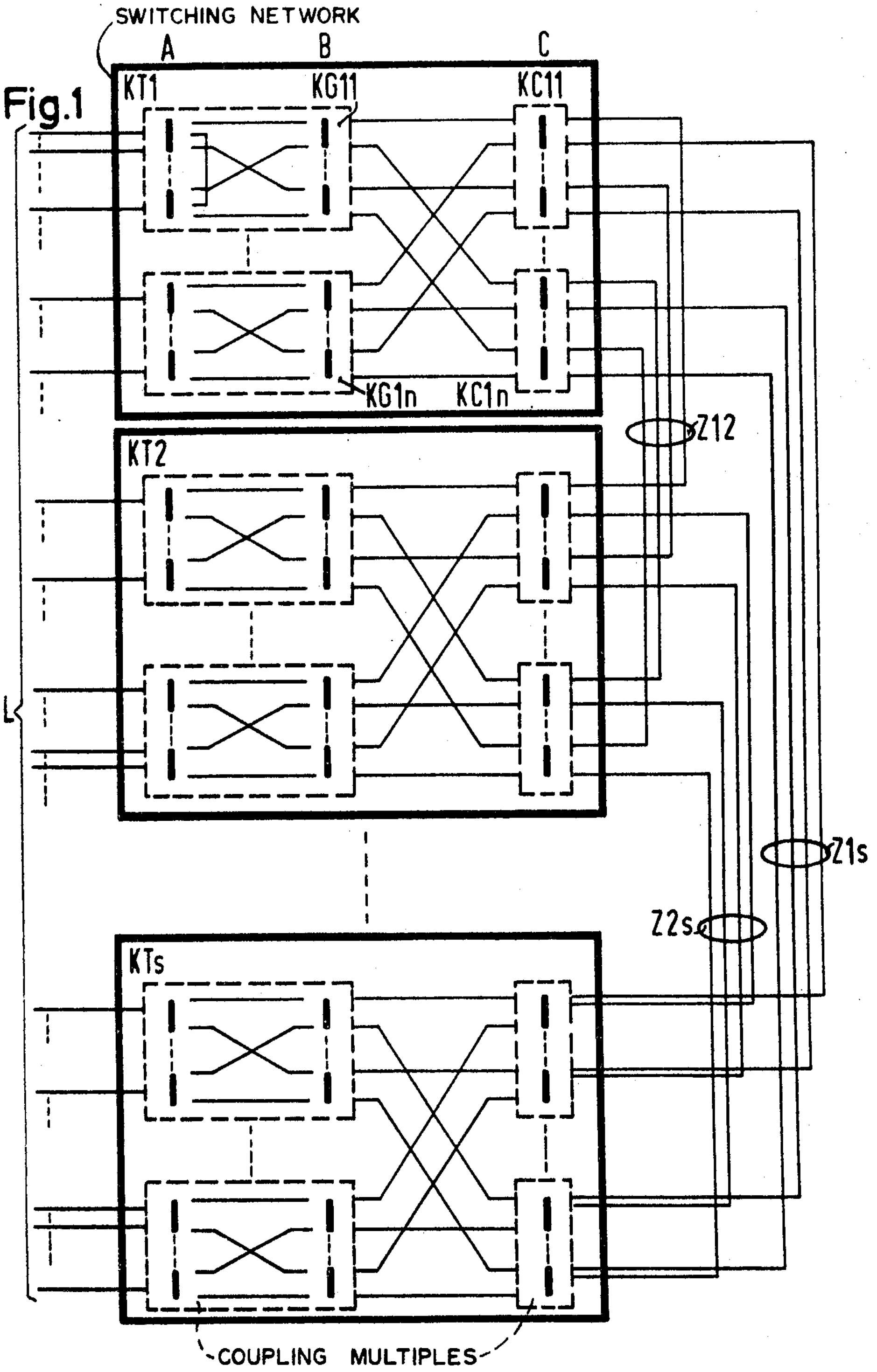
FIG. 1 is a schematic diagram of a pertinent portion of a preferred embodiment of a telecommunication exchange installation switching network constructed according to the principles of this invention.

DETAILED DESCRIPTION OF THE DRAWINGS:

The switching network with reverse grouping shown in FIG. 1 is constructed in three stages and a two-wire arrangement is given. It is divided into several switching network components KT1 through KT*s*. Each of those switching network components is arranged in a generally fan-shaped manner; i.e., from each of the inputs of each of the switching network components, the outputs can be reached, respectively, only over a single path. Thus, with occupation of an input of a switching network component and selection of a particular one of its outputs, the path to be completed over the switching network, which path represents a part of a connection to be completed, is uniquely established. The inputs of the switching network are wired with four-wire lines and switching elements, meaning local and long distance lines, connection sets, dial receiving registers, forwarding registers, and the like. To simplify the description, the following considers only four-wire lines L. The outputs of the switching network components KT1 through KT*s* are connected separately with each other pairwise over groups of four-wire intermediate lines **Z12, Z1*s*, Z2*s*.**

The coupling multiples within a switching network component, e.g., KT1 are collected in the third coupling stage C into coupling multiple rows KC11 through KC1*n*. The named groups of intermediate lines **Z12, Z1*s*, Z2*s*** connect, separately, outputs of such coupling multiples pairwise, which in the different switching network components belong to the same coupling multiple rows and lie therein in the same position.

In each of the switching network components, e.g., KT1, the coupling multiples of the coupling stage A and B are arranged in coupling groups KG11 through KG1*n*. Within a coupling group, e.g., KG11, an output of each of the coupling multiples belonging to the coupling stage A is connected, respectively, over a single intermediate line with an input of each of the coupling multiples of this coupling group belonging to the coupling stage B. Thus, an intermediate line leads from each coupling multiple of the coupling stage A to each coupling multiple of the coupling stage B in each of the coupling groups. Further, the output of the coupling multiples of the coupling stage B are connected separately in the indicated manner with inputs of coupling multiples of coupling stage C.

Figure 2:
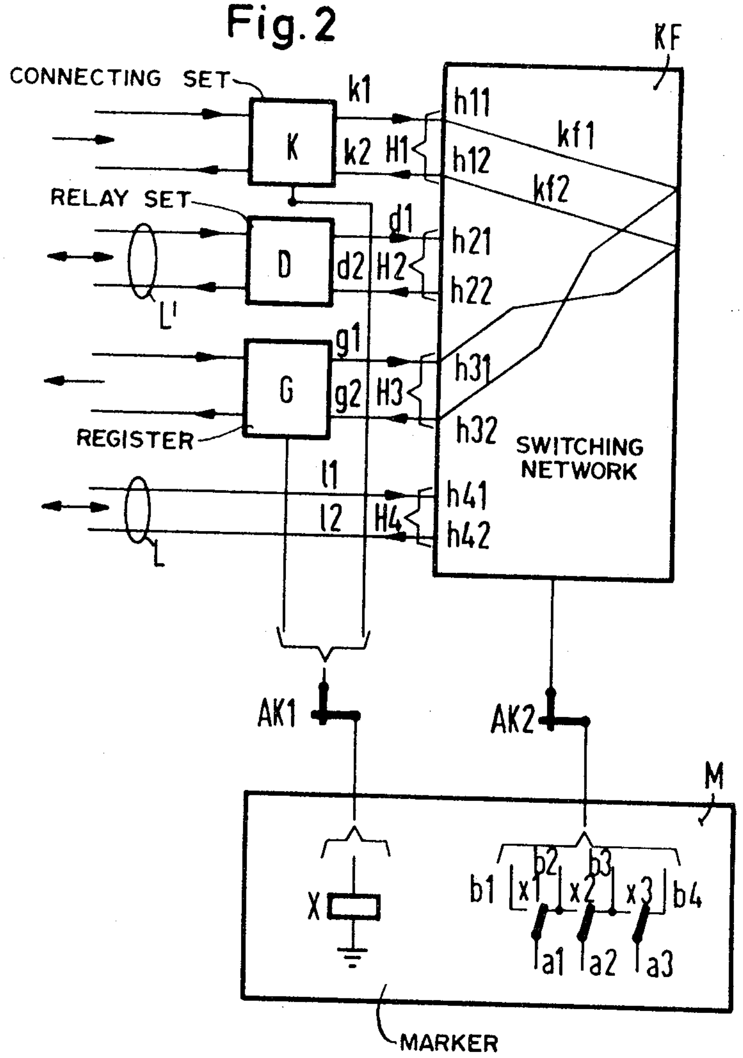
FIG. 2 is a simplified diagram of the FIG. 1 embodiment.

Further details of the invention are represented in FIG. 2. In this figure, the switching network shown in FIG. 1 in greater detail is displayed in greatly simplified form, and denoted by "KF". The switch-ing network is arranged for two-wire switching. Four-wire mechanisms are connected to its inputs. In this context, four-wire mechanisms means 4-wire lines and switching elements necessary for each connection, as defined hereinabove. These four-wire lines can be local connection lines and long distance lines, and can be incoming, outgoing directed, or two-way with respect to the direction of the establishment of a connection. A two-way line L is shown in FIG. 2.

Three further four-wire mechanisms are shown in FIG. 2. Each of these are not described in detail but they are well known components. A relay set D can, for example, be a line repeater for two-way traffic. In this case, therefore, a four-wire line L′ is connected to the side of this relay remote from the switching network. Here, the concern is, therefore, with a four-wire line which can be connected to the switching network not directly, as is the four-wire line L, but over a line repeater. With the establishment of a connection over the line L, the dual signals for the establishment of a connection are also transmitted over this line. The four-wire line L runs to another exchange station, which is in direct data communication with the exchange station here being described. By direct data communication, it is meant that the central control mechanisms in the two exchanges are in direct communication with each other. The data being communicated are dial signals, as described hereinabove.

The fact that the dial signals for the establishment of a connection over the four-wire line L are not transmitted thereover enables the otherwise customary line repeaters at the ends of the connection lines to be spared; the four-wire connection lines are connected, as shown for the line L, directly to the inputs of the switching network KF.

Further, a connection set K and a forwarding register G are represented as four-wire mechanisms. These serve to receive and pass on (connection set K) and receive and transmit (forwarding register G) dial signals to or from a central register. The connecting set K is, as shown, incoming, whereas, the forwarding register G is outgoing. This direction of the establishment of a connection is shown by the arrows (i.e., double arrows) to the left respectively between the two two-wire branches of a four-wire arrangement. Further, for the purpose of simplifying the description, the connection set K, the line repeater D, the forwarding register G and the four-wire line L are together denoted as "four-wire mechanisms."

Each of these four-wire mechanisms has, as viewed with respect to the transmission direction from the switching network, an incoming two-wire branch, e.g., *k*1, *d*1, *g*1, and 1, and an outgoing two-wire branch *k*2, *d*2, *g*2, and 2. The inputs of the switching network are arranged in a two-wire configuration just as the switching network itself. These switching network inputs are denoted *h*11, *h*12, etc., through *h*42. The switching inputs are divided into first switching network inputs, e.g., *h*11, *h*21, *h*31 and *h*41 and into second switching network inputs, e.g., *h*12, *h*22, *h*32 and *h*42. Of these two-wire switching network inputs a first, e.g., *h*11, and a second, e.g., *h*12, are attached to a so-called input pair, e.g., H1. Each input pair is wired with a four-wire line.

The pattern of association of a first and a second switching network input to an input pair can be determined arbitrarily. For this purpose, the two-wire switching network inputs can be numbered consecutively, and the uneven numbered switching network inputs can be used as first and the even numbered switching network inputs as second switching network inputs. Further, consecutively numbered switching network inputs can be associated pairwise to each other.

In wiring the two-wire inputs of the switching network KF to the four-wire mechanisms, then the incoming, outgoing and two-way four-wire mechanisms are all handled in an equivalent manner. The two-wire branch provided for the incoming (from the point of view of the switching network) transmission direction, e.g., *k*1, of the four-wire mechanism, e.g., K, is always joined to the first switching network input, e.g., *h*11, and the two-wire branch provided for the outgoing transmission direction, e.g., *k*2, is always joined to the second switching network input e.g., *h*12. The switching network wiring is, therefore, standardized for all types of four-wire mechanisms, independent of their particular type and independent of the respective direction of the establishment of a connection for which they are arranged.

This standard method of wiring is of great advantage for the construction and for the operation of a telephone exchange installation, because in contrast to traditional exchange installations, one need not differentiate between incoming, outgoing and two-way four-wire mechanisms.

In order to connect the correct two-wire branches with each other in the establishing of a connection between two four-wire mechanisms, two two-wire connections are established, respectively, as follows: Between the first switching network input, e.g., *h*11, of the input pair, e.g., H1, associated with the one four-wire mechanism, e.g., K, and the second switching network input, e.g., *h*32 of the input pair, e.g., H3, associated with the other four-wire mechanism, e.g., G, a two-wire connection, e.g., *kf*1, is established; a further two-wire line, e.g., *kf*2, is connected between the second switching network input, e.g., *h*12, of the input pair, e.g., H1, associated with the one four-wire mechanism, e.g., K, and the first switching network input, e.g., *h*31, of the input pair, e.g., H3, associated with the other four-wire mechanism, e.g., G. These two two-wire connections, e.g., *kf*1 and *kf*2, are shown symbolically in the switching network KF. They reverse within the switching network in accordance with the definition of reverse grouping. It is noteworthy, that these two two-wire connections are switched within the switching network such that they effect a telephone pair crossing for all practical purposes. To this end, appropriate provisions are made in the central control mechanism of the telephone exchange installations, which are discussed hereinbelow.

The connection set K is set by a central marker M. The marker M can be connected, for this purpose, over connection couplers AK1, AK2 to the named four-wire mechanism as well as to the named switching network. It is assumed that a four-wire mechanism, e.g., K, is to be connected to another four-wire mechanism, e.g., G. The marker is requested from the incoming four-wire mechanism K, and is connected over the connection coupler AK1 to this four-wire mechanism. The dial signals are received over the four-wire mechanism and transmitted to the marker M. The marker converts a portion of the dial signals into a setting datum. This setting datum is transmitted in two parts, consecutively, to the switching network KF. The first part of this setting datum causes a two-wire connection *kf*1 to be completed from the switching network input *h*11 to the switching network input *h*32. Thus, the two-wire branches of differential transmission direction (as viewed from the switching network) of the two four-wire mechanisms are connected together.

If for this establishment of a connection there existed the freedom of a selection from among several mechanisms equivalent to the four-wire mechanism G, then the marker M could have next arbitrarily selected one of these four-wire mechanisms, and then completed the described two-wire connection *kf*1. However, through the selection of the switching network input *h*32, the establishment of the connection was already assigned to the four-wire mechanism G.

After the first two-wire connection completion, the marker M does not shut itself off again, as is usually the case, but remains connected with the four-wire mechanism K and the switching network KF. After delivery of the setting datum for the switching of the two-wire connection *kf*1, the relay X is excited. This can follow from the appropriate four-wire mechanism, e.g. K, after the resultant connection has been registered. If the relay X responds, it shifts the setting datum applied to the wires *a*1 through *a*3 from the wires *b*2 through *b*4 to the wires *b*1 through *b*3. This results in the second part of the setting datum being dependent on the first part of the setting datum, and on the basis of this, that input and that output of the switching network are connected together, which have corresponding inputs and outputs already connected with each other with the delivery of the first part of the setting datum (two-wire connection *kf*1). The establishment of the two-wire connection *kf*2 is thus dependent on the first two-wire connection *kf*1. Herewith, the course of the second two-wire connection within the switching network can be arbitrary. What is decisive is merely that the two two-wire inputs of an input pair are connected with the two two-wire inputs of another input pair for wire pair crossing. The second two-wire connection uses, therefore, the selection processes executed with the fist two-wire connection to locate another four-wire mechanism to be connected with the incoming and occupied four-wire mechanism in accordance with received dial signals.

Further, the possibility exists not only of switching connections between four-wire mechanisms in the described manner over the switching network, but also switching connections between two-wire mechanisms. Here "two-wire mechanisms" means all two-wire lines, e.g., local conection lines, subscriber lines, etc., and all switching mechanisms necessary for each connection, e.g., connection sets, couplers, and the like. These two-wire mechanisms are each connected only to a single switching network input. For the completion of connections the marker M is active only once in this case. It serves, therefore, to switch connections between four-wire mechanisms, as well as between two-wire mechanisms. The same switching network KF serves for all connection switching.

The preferred embodiment of the invention described hereinabove is intended only to be exemplary of the principles of this invention, and is in no way to be considered as limiting the scope of the invention. The scope of the invention is defined by the appended claims.

I claim:

1. In a telecommunication exchange installation having at least one switching network constructed for two wire switching and comprised of a plurality of coupling multiples arranged in a plurality of coupling stages connected to each other over intermediate lines, the outputs of the coupling multiples in the first through last coupling stages being connected, respectively, to the inputs of the next succeeding coupling stage in a pairwise manner, the inputs of said first coupling stage having connected thereto all of the local and long distance lines and inputs and outputs of switching elements necessary for the completion of a connection, the improvement comprising:

a plurality of first and second inputs to said switching network, of which a first and a second input form an input pair, means connecting at least one input pair to a four wire element, comprising two, two-wire branches, said four wire element being one of the local and long distance lines or the switching elements necessary to complete a given connection, said connections to input pairs being completed in such a manner that for each said four wire element, a first two wire branch for one transmission direction is connected to a first input of said pair and a second two wire branch for another transmission direction is connected to a second input of said pair, and means connecting two 4 wire mechanisms over said switching network comprising;

first two wire connection means between a first input of a first input pair associated with a first four wire mechanism and a second input of a second input pair associated with a second four wire mechanism and second two wire connection means between a second input of said first input pair and a first input of said second input pair.

2. The improved telecommunication exchange switching network defined in claim 1 further comprising single marker means for establishing said two wire connections.

* * * * *